United States Patent
Manoogian et al.

[15] 3,645,493
[45] Feb. 29, 1972

[54] FAUCET VALVE

[72] Inventors: Alex Manoogian, Grosse Pointe Farms; Eric V. Pullen, Northville, both of Mich.

[73] Assignee: Masco Corporation, Taylor, Mich.

[22] Filed: Oct. 12, 1970

[21] Appl. No.: 79,908

[52] U.S. Cl. .................................. 251/120, 251/310
[51] Int. Cl. .............................. F16k 5/04, F16k 5/18
[58] Field of Search ............... 251/118, 120, 209, 309, 310

[56] References Cited

UNITED STATES PATENTS 3,176,888  4/1965  Focht ........................... 251/310 X
3,475,002  10/1969  Phillips ........................ 251/209 X

FOREIGN PATENTS OR APPLICATIONS 1,033,980  7/1958  Germany ....................... 251/309

Primary Examiner—Henry T. Klinksiek
Attorney—Whittemore, Hulbert & Belknap

[57] ABSTRACT

A water faucet comprising a rotatable valving member having a vertically disposed inlet passage in its bottom surface offset from the axis of rotation and movable into and out of registry with an inlet port in the bottom wall of the valve body and having an interior laterally extending discharge passage through which water is discharged to the outlet port in the valve body. The inlet and discharge passages in the valving member are so arranged relative to the inlet and outlet ports in the valve body that when there is only slight communication between the inlet passage and inlet port, the water must flow through a narrow channel defined between the valving member and valve body, rather than directly from the discharge passage to the outlet port, thus creating a back pressure which serves to reduce the noise of operation of the faucet.

7 Claims, 7 Drawing Figures

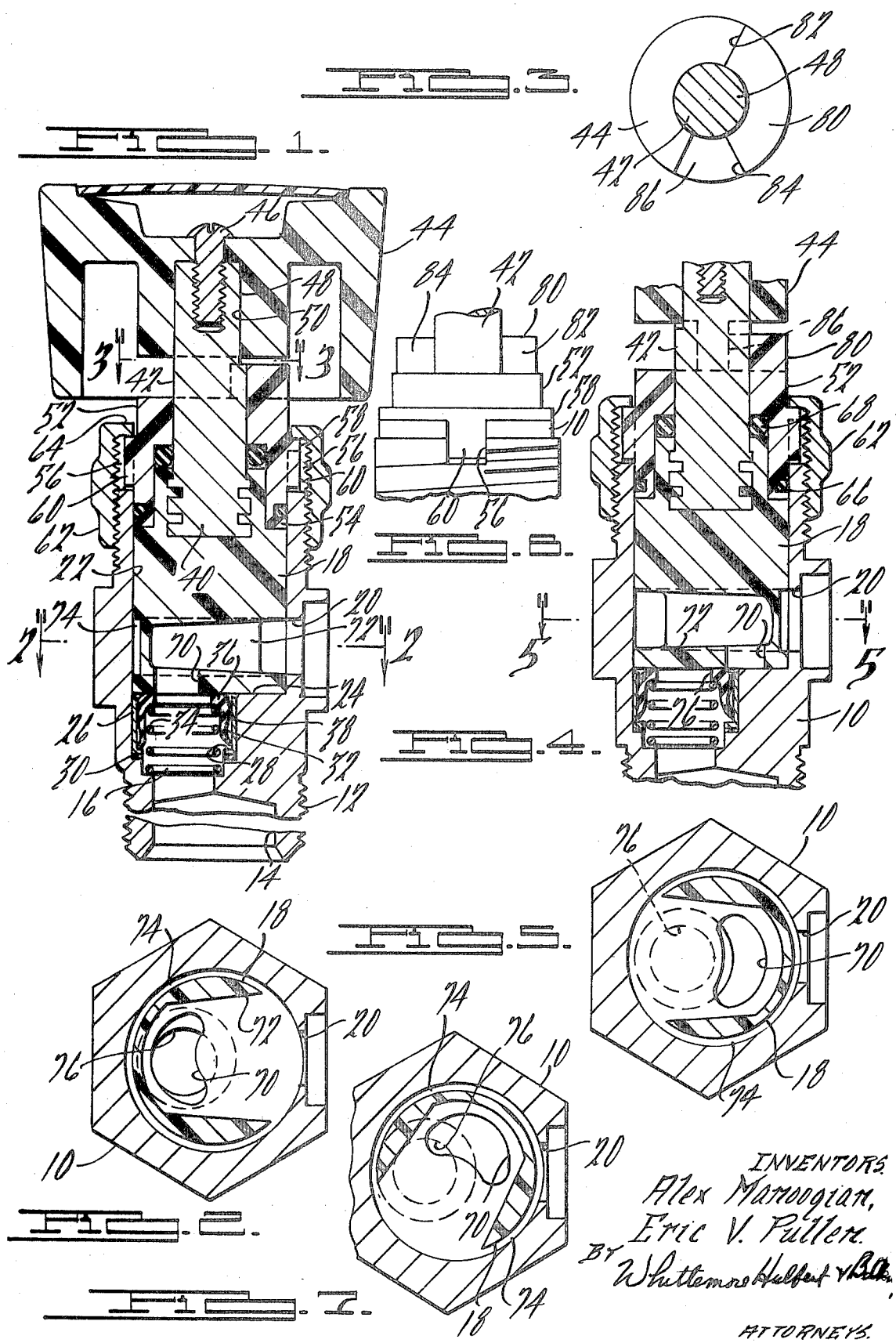

FAUCET VALVE

The invention is directed to a faucet valve construction of the kind in which a separate valve is provided for the hot and cold waterlines and such valves discharge into a common spout. Valves of this type are generally of the compression type which are inherently subject to wear and deformation of the seals and which also are likely to be noisy in operation, particularly during initial opening and final closing of the valves.

The faucet of this invention utilizes a valving member which is rotated over an annular seal provided in the inlet port of the valve body so that there is no compression or distortion of the seal during operation. A further feature of the present invention resides in the provision of a narrow channel between the valving member and the valve body through which the water must pass to reach the outlet port in the valve body whenever the valve is only slightly open, thus producing a back pressure which reduces the noise of operation of the faucet. When the valve is fully open there is an unobstructed flow of water directly through the valving member to the outlet port. The assembly also includes provisions for enabling the valve to be easily assembled for either clockwise or counterclockwise rotation as the valving member is moved from its closed to its open position.

In the drawings:

FIG. 1 is a vertical sectional view through a faucet valve embodying the present invention and showing the valve in its full open position;

FIG. 2 is a sectional view taken on line 2—2 of FIG. 1;

FIG. 3 is a sectional view taken on line 3—3 of FIG. 1;

FIG. 4 is a fragmentary sectional view similar to FIG. 1 but showing the valve in its closed position;

FIG. 5 is a sectional view taken on line 5—5 of FIG. 4;

FIG. 6 is a fragmentary elevational view of a portion of the assembly; and

FIG. 7 is a sectional view similar to FIGS. 2 and 5 but showing the valve in a partially open position.

In the drawings a generally cylindrical valve body 10 comprises a lower externally threaded portion 12 which is adapted to be connected in a conventional manner to either the hot or cold waterline. The water flows upwardly through the bore 14 in the portion 12 of the valve body to an inlet port 16 and through the interior of a rotatable valving member 18 to the outlet port 20. A suitable length of tubing is adapted to have one end connected to the outlet port 20 of the valve body 10 and to lead to a common discharge spout of conventional construction which is similarly connected to the other faucet which is of identical construction.

The upper end of the valve body 10 is provided with a cylindrical bore 22 having a flat bottom wall 24. The inlet port 16 is laterally offset from the axes of the bores 14 and 22 and opens into the bottom wall 24 of the bore 22. The inlet port 16 is adapted to receive a cylindrical ring 26 having its bottom wall 28 seated against a sealing gasket 30 and provided with an opening in alignment with the inlet port 16. An annular rubber seal 32 is disposed within the ring member 26 and a spring 34 disposed within the seal 32 urges the seal upwardly against the bottom surface of the valving member 18. The upper wall 36 of the seal 32 has a circular opening therein, an annular external ridge 38, and an outwardly flared and tapered lower end which sealingly engages the ring 26.

The valving member 18 comprises a generally cylindrical member which may be made of a suitable plastic and has the lower end 40 of an operating stem 42 embedded therein. The lower end 40 of the stem 42 is provided with annular grooves and a flat thereon to rigidly secure the valving member to the stem. An operating handle 44 is secured to the upper end of the stem 42 by a screw 46 and a flat 48 on the upper end of the stem 42 engages a correspondingly shaped portion of an opening 50 in the handle 44 to prevent relative rotation between the handle 44 and stem 42.

The stem 42 is rotatable within a fixed stop member 52 which has its lower end 54 inserted within the upper end of bore 22 in valve body 10. At its upper end the valve body 10 is provided with two diametrically opposed notches 56. The member 52 has an annular shoulder 58 seated against the upper end of the valve body 10 and is also provided with a pair of diametrically opposed ribs 60 which are disposed within the notches 56 in the valve body to prevent rotation of the member 52 relative to the valve body. A collar 62 threadedly engages the upper end of the valve body 10 and has its top wall 64 engaging the upper surface of the shoulder 58 on the member 52 so that when the collar 62 is tightened the valving member 18 will be firmly seated against the bottom wall 24 of the bore 22 in the valve body. An O-ring 66 provides a seal between the stop member 52 and the valve body and an O-ring 68 surrounds the valve stem 42 and provides a seal between the valve stem and the member 52.

The valving member 18 is provided with a kidney-shaped opening 70 in its bottom wall which opens into a laterally extending discharge passage 72. The exterior surface of the valving member 18 is provided with a portion of reduced diameter which defines a narrow cylindrical channel 74 between the valving member 18 and the valve body 10 which extends completely around the valving member 18. The outer end of the discharge passage 72 is adapted to be aligned with the outlet port 20 in the valve body when the valve is in the full open position shown in FIGS. 1 and 2, and at such time the opening 70 in the valving member 18 has its maximum communication with the opening 76 in the seal member 32.

The valve is shown in FIGS. 4 and 5 in its closed position in which it will be seen that the inlet passage 70 in the valving member 18 is out of registry with the opening 76 which defines the inlet port. The bottom surface of the valving member 18 merely rotates over the seal 32 while the spring 34 urges the seal into sealing engagement with the under surface of the valving member 18. The water pressure within the inlet port 16 causes the lower end of the seal and the ridge 38 to sealingly engage the ring 26.

The stop member 52 is provided at its upper end with a portion 80 which presents angularly spaced stop shoulders 82 and 84. The handle 44 has an integral depending lug 86 engageable with shoulders 82 and 84. The angular extent of lug 86 is such that the handle and the valving member may be rotated through 180° between open and closed positions. With this construction, together with the provision of the diametrically opposed ribs 60 on the stop member 52, it is possible to easily reverse the direction of opening movement of the handle by loosening the collar 62 and turning the stop member 180° to reverse the engagement of the ribs 60 in the notches 56 in the valve body.

In FIG. 7 the valving member 18 is shown in a position in which its inlet passage 70 has just begun to communicate with the inlet port 76, assuming counterclockwise rotation of the valving member as viewed in FIG. 7. It has been found that most of the operating noise of water faucets occurs when the valve is first cracked open and just prior to complete closing of the valve. The relationship of the inlet and outlet passages 70 and 72 in the valving member relative to the inlet and outlet ports of the valve body is such that in either of the aforesaid positions of the valve as shown in FIG. 7, the water is not free to flow directly to the outlet port in the valve body but must flow through the annular channel 74 before reaching the outlet port. The size of the channel 74 is somewhat exaggerated in the drawings for the purpose of clarity. The provision of the channel 74 results in a slight back pressure at the inlet port 76 which effectively reduces the noise of operation when the valve is first opened or approaches final closing as illustrated in FIG. 7.

What we claim as our invention is:

1. A faucet valve comprising a valve body having an upwardly opening bore, said valve body having an inlet port opening into and offset from the axis of said bore and an outlet port, a valve member rotatable in said bore and having an inlet passage offset from the axis of rotation of said valve member and a discharge passage communicating with said outlet port, said valve member upon rotation thereof being adapted to bring its inlet passage into and out of registry with said inlet port in said valve body, and means defining a restricted passage means between said valve member and valve body and through which water must flow from said discharge passage to said outlet port when said inlet passage has only partial registration with said inlet port.

2. A valve according to claim 1 wherein a vertically disposed annular seal is disposed in said inlet port, said valve member having a flat bottom surface containing said inlet passage and which surface is in sliding contact with said seal upon rotation of said valve member, and means urging said seal into sealing engagement with said surface of said valve member.

3. A valve according to claim 1 wherein said valve member is cylindrical and said restricted passage means is provided by a reduced diameter portion thereof, said discharge passage opening into said reduced diameter portion of said valve member.

4. A valve according to claim 1 including a fixed stop member secured in the upper end of said valve body, an operating member for rotating said valve member, stop means on said stop member and operating member for limiting rotation of the latter between full open and closed positions of said valve member, and cooperating means on said valve body and stop member for locating the latter in either of two positions to permit selective directional rotation of said operating member from closed to open position.

5. A faucet valve comprising a valve body having an upwardly opening bore provided with a generally flat bottom wall, said valve body having an inlet port opening into said bottom wall and offset from the axis of said bore, and an outlet port in the cylindrical wall of said bore, a valve member rotatable in said bore and having a generally flat bottom surface, said valve member having an inlet passage opening from said bottom surface and offset from the axis of rotation of said valve member, and a laterally extending discharge passage communicating with said outlet port, said valve member upon rotation thereof being adapted to bring its inlet passage into and out of registry with said inlet port in said valve body, and means defining a restricted passage means between said valve member and valve body communicating at all times with said discharge passage, said inlet and discharge passages in said valve member and said inlet and outlet ports in said valve body being relatively disposed so that water must flow from said discharge passage through said restricted passage means to said outlet port when said inlet passage has only slight registration with said inlet port.

6. A valve according to claim 5 wherein said valve member is cylindrical and said restricted passage means is provided by a reduced diameter portion thereof, said discharge passage opening into said reduced diameter portion of said valve member.

7. A valve according to claim 6 including a fixed stop member secured in the upper end of said valve body, an operating member for rotating said valve member, stop means on said stop member and operating member for limiting rotation of the latter between full open and closed positions of said valve member, and cooperating means on said valve body and stop member for locating the latter in either of two positions to permit selective directional rotation of said operating member from closed to open position.

* * * * *